(12) United States Patent
Mullaney

(10) Patent No.: US 8,160,236 B2
(45) Date of Patent: Apr. 17, 2012

(54) ENHANCED TELECOMMUNICATION SIGNAL INSERTION SYSTEMS AND METHODS

(75) Inventor: Julian Mullaney, Raleigh, NC (US)

(73) Assignee: Tyco Electronics Corporation, Middletown, PA (US)

( * ) Notice: Subject to any disclaimer, the term of this patent is extended or adjusted under 35 U.S.C. 154(b) by 875 days.

(21) Appl. No.: 12/237,046

(22) Filed: Sep. 24, 2008

(65) Prior Publication Data

US 2009/0080626 A1   Mar. 26, 2009

Related U.S. Application Data

(60) Provisional application No. 60/975,310, filed on Sep. 26, 2007.

(51) Int. Cl.
*H04M 3/00* (2006.01)
(52) U.S. Cl. .................................. 379/327; 379/413.04
(58) Field of Classification Search .................. 379/327, 379/27.01, 16, 332, 413.04
See application file for complete search history.

(56) References Cited

U.S. PATENT DOCUMENTS

| | | | |
|---|---|---|---|
| 6,438,226 B1 * | 8/2002 | Guenther et al. | 379/413.04 |
| 2007/0047732 A1 * | 3/2007 | Kennedy | 379/413.02 |

FOREIGN PATENT DOCUMENTS

| | | |
|---|---|---|
| WO | WO 02/11249 A1 | 2/2002 |
| WO | WO 2005/057948 A1 | 6/2005 |
| WO | WO 2005/091613 A1 | 9/2005 |

OTHER PUBLICATIONS

International Search Report and Written Opinion (11 pages) corresponding to International Application No. PCT/US2008/011135; Mailing Date: Feb. 18, 2009.

* cited by examiner

*Primary Examiner* — Creighton Smith
(74) *Attorney, Agent, or Firm* — Myers Bigel Sibley & Sajovec

(57) ABSTRACT

An enhanced telecommunication signal insertion system includes a first connection block field including a plurality of switches configured to be coupled to an enhanced signal source and a second connection block field including a plurality of normally closed switches configured to connect respective pairs of tip and ring lines from a central office to corresponding pairs of tip and ring lines to associated subscriber locations and a jumper plug. The jumper plug has a first connector and a second connector with a length of cable extending therebetween. The first connector is configured to be inserted in one of the normally closed switches of the second connection block field to open the one of the normally closed switches. The second connector is configured to be inserted in one of the switches of the first connection block field. When inserted, the jumper plug connects terminals of the one of the switches of the first connection block field to terminals of the one of the normally closed switches of the second connection block field to allow insertion of the enhanced telecommunication signal onto a selected one of the pairs of tip and ring lines to one of the associated subscriber locations associated with the one of the normally closed switches of the second connection block field.

20 Claims, 11 Drawing Sheets

US 8,160,236 B2

ENHANCED TELECOMMUNICATION SIGNAL INSERTION SYSTEMS AND METHODS

RELATED APPLICATIONS

The present application claims priority from U.S. Provisional Application No. 60/975,310, filed Sep. 26, 2007, the disclosure of which is hereby incorporated herein in its entirety by reference.

BACKGROUND OF THE INVENTION

The present invention relates to communication cable termination systems and, more particularly, to optical fiber termination systems and methods for terminating the same.

In many telecommunications networks, some or even all of the network is a copper distribution network (i.e., includes use of copper wiring for tip and ring lines). This network generally is used to carry both Plane Old Telephone Service (POTS) and enhanced telecommunications signals, such as Digital Subscriber Line (xDSL) signals, to subscriber locations 44 of such enhanced services and a central office 42. Metallic connectivity in such a network generally must be provided between whichever of the, typically, 200 block of subscriber locations of subscribers desiring the high speed xDSL service and a corresponding one of the, typically, 48 port xDSL port block. A problem may arise when this metallic connectivity is performed by additional jumpers inside an already congested cross connect box.

In typical installations, as illustrated in FIGS. 1 and 2, the connectivity is achieved by intercepting an individual subscriber's POTS line (tip and ring) 52 to a corresponding subscriber location 44 at an existing POTS cross connect box or accessing a trunk line and providing a cross-connect box 30 for this purpose. As such, each of the in and out Tip and Ring pairs must be wired into the cross-connect box 30 from the central office cable 50 and the subscriber location cable 52 and jumpers 31 provided therebetween. The interception is generally achieved by disconnecting a subscriber's twisted pair jumper 31 between the F1 (Central Office (CO) 42 side) and the F2 (subscriber location 44 side) within the cross connect box 30.

As seen in FIG. 2, a new jumper 34 is then run from the F1 side to an alternate location in the cross connect box 30 to a separate connection field 20. This routes the subscriber's line from the old CO side through the DSL port in/out connection field 20 and hardwired tail 22 to the Digital Subscriber Line Access Multiplexer (DSLAM) 10, where the xDSL signal is injected onto the line. Then, a second jumper 32 is run from the xDSL output field to the F2 side of the cross connect 30, which further connects through the hardwired tail 24 via the connection field 20 to the DSLAM 10 output. This second jumper 32 connects the enhanced signal back onto the copper twisted pair running to the subscriber location 44. This approach may create problems with removing old jumpers, replacing them with new jumpers, routing of the new jumpers within the box, and lack of space for the new connection field for the DSLAM in and out ports. Note that the cross connect box may be an existing cross connect box, or a newly installed smaller cross connect box specifically installed as a part of upgrading a network to provision higher speed services.

SUMMARY OF THE INVENTION

Some embodiments of the present invention provide enhanced telecommunication signal insertion systems including a first connection block field, a second connection block field and a jumper plug. The first connection block field includes a plurality of switches configured to be coupled to an enhanced signal source. The second connection block field includes a plurality of normally closed switches configured to connect respective pairs of tip and ring lines from a central office to corresponding pairs of tip and ring lines to associated subscriber locations. The jumper plug has a first connector and a second connector with a length of cable extending therebetween. The first connector is configured to be inserted in one of the normally closed switches of the second connection block field to open the one of the normally closed switches. The second connector is configured to be inserted in one of the switches of the first connection block field. When inserted, the jumper plug connects terminals of the one of the switches of the first connection block field to terminals of the one of the normally closed switches of the second connection block field to allow insertion of the enhanced telecommunication signal onto a selected one of the pairs of tip and ring lines to one of the associated subscriber locations associated with the one of the normally closed switches of the second connection block field.

In further embodiments, the enhanced signal source is a Digital Subscriber Line (xDSL) signal source and the enhanced telecommunication signal is an xDSL signal. The xDSL signal source may insert the xDSL signal onto the selected one of the pairs of tip and ring lines to the associated subscriber locations along with other telecommunications signals carried between the central office and the one of the associated subscriber locations. The other telecommunications signals may be plain old telephone service (POTS) signals. The enhanced signal source may be a Digital Subscriber Line Access Multiplexer (DSLAM)

In other embodiments, the terminals of the one of the normally closed switches include a first tip line terminal and a first ring line terminal configured to connect to the selected one of the pairs of tip and ring lines from the central office and a second tip line terminal and a second ring line terminal configured to connect to the selected one of the pairs of tip and ring lines to the subscriber associated subscriber locations. The first tip line terminal and the second tip line terminal are normally connected and the first ring line terminal and the second ring line terminal are normally connected. The first connector may be configured to be inserted between the first and second tip line terminals and the first and second ring line terminals to break the connection therebetween.

In further embodiments, the length of cable includes a first conductor extending from the first tip line terminal to a first one of the terminals of the one of the switches of the first connection block field configured to be coupled to a first input to the enhanced signal source. A second conductor extends from the first ring line terminal to a second one of the terminals of the one of the switches of the first connection block field configured to be coupled to a second input to the enhanced signal source. A third conductor extends from the second tip line terminal to a third one of the terminals of the one of the switches of the first connection block field configured to be coupled to a first output of the enhanced signal source. A fourth conductor extends from the second ring line terminal to a fourth one of the terminals of the one of the switches of the first connection block field configured to be coupled to a second output of the enhanced signal source.

In other embodiments, the enhanced signal source is a DSLAM that is configured to couple the POTS signals between the first input to the DSLAM and the first output of the DSLAM and between the second input of the DSLAM and the second output of the DSLAM to couple the POTS signals between the central office and the one of the associated subscriber locations when the first connector is inserted in the one of the normally closed switches of the second connection block field to open the one of the normally closed switches.

In further embodiments, the system further includes the DSLAM with the first one of the terminals coupled to the first input to the DSLAM, the second one of the terminals coupled to the second input to the DSLAM, the third one of the terminals coupled to the first output of the DSLAM and the fourth one of the terminals coupled to the second output of the DSLAM. The system may further include a respective pair of tip and ring lines from the central office and pairs of tip and ring lines to the associated subscriber locations coupled to the plurality of normally closed switches of the second connection block field.

In yet other embodiments, the system includes a signal receiving and identification module configured to identify the one of the normally closed switches to be coupled to the enhanced signal source. The signal receiving and identification module may be configured to detect a ring signal on the selected one of the pairs of tip and ring lines from the central office and to one of the associated subscriber locations associated with the one of the normally closed switches and to activate an identification signal responsive to detection of the ring signal. The signal receiving and identification module may be configured to detect a specified ring signal pattern that is distinguishable from a normal ring signal pattern and the identification signal is activated responsive to the specified ring signal pattern and is not activated responsive to the normal ring signal pattern.

In further embodiments, the signal receiving and identification module includes a plurality of visual signal sources, a selected one of which is activated responsive to the identification signal, ones of which are positioned proximate respective associated ones of the plurality of normally closed switches. The signal receiving and identification module may be a plug-in test device configured to be inserted into the one of the normally closed switches, the plug-in test device including a visual signal source positioned proximate the one of the normally closed switches when the plug-in test device is inserted therein that is activated responsive to the identification signal. The plug-in test device may be configured to be concurrently inserted into a plurality of the normally closed switches and the plug-in test device may include a plurality of visual signal sources, a selected one of which is activated responsive to the identification signal, ones of which are positioned proximate respective associated ones of the plurality of normally closed switches when the plug-in test device is inserted therein.

In yet other embodiments, enhanced telecommunication signal insertion systems are provided including a connection block field and a jumper plug. The connection block field includes a plurality of normally closed switches configured to connect respective tip and ring lines from a central office to subscriber locations. The jumper plug has a connector on a length of cable extending from an enhanced signal source. The connector is configured to be inserted in one of the normally closed switches of the connection block field to open the one of the normally closed switches. When the connector is inserted in the one of the normally closed switches, the jumper plug connects the enhanced signal source to terminals of the one of the normally closed switches of the second connection block field to allow insertion of the enhanced telecommunication signal onto the respective tip and ring lines to the subscriber locations.

In further embodiments, methods of inserting an enhanced telecommunication signal onto a pair of tip and ring lines from a central office to a subscriber location are provided, including breaking the connection of the tip and ring lines at a connection block field located between the central office and the subscriber location by inserting a connector on a first end of a jumper plug into a normally closed switch in the connection block field to open the normally closed switch. The normally closed switch is configured to connect respective central office and subscriber sides of the tip line and central office and subscriber sides of the ring line when closed. A second end of the jumper plug is connected to an enhanced signal source. When the connector is inserted into the normally closed switch, the jumper plug connects the enhanced signal source to terminals of the normally closed switch to allow insertion of the enhanced telecommunication signal onto the subscriber side tip and ring lines. When the connector is inserted into the normally closed switch, the jumper plug may connect the enhanced signal source to terminals of the normally closed switch to allow the enhanced signal source to insert the enhanced telecommunication signal onto the of tip and ring lines along with other telecommunications signals carried between the central office and the subscriber side.

DETAILED DESCRIPTION OF EMBODIMENTS OF THE INVENTION

Figure 1:
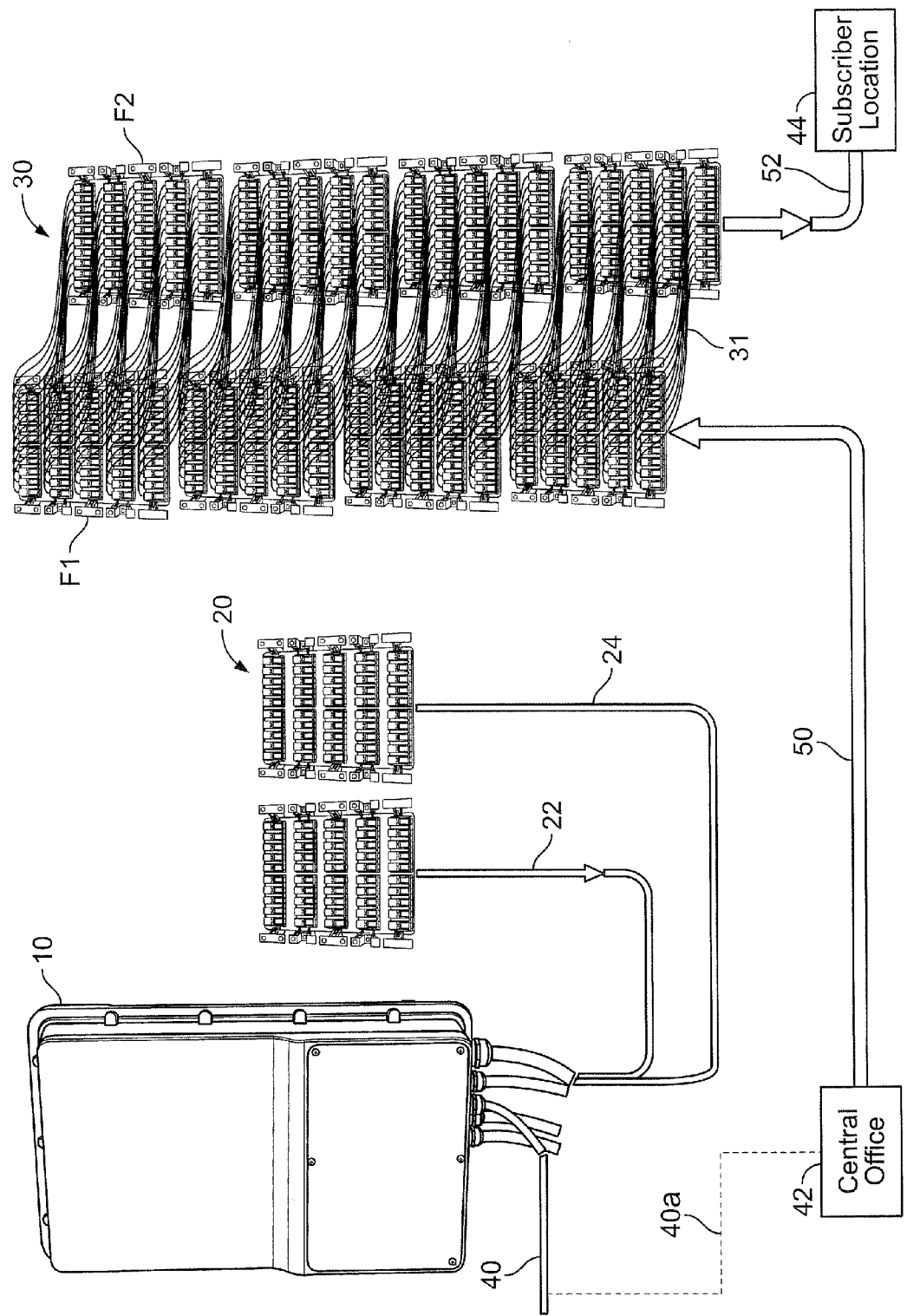
FIGS. 1 and 2 are schematic diagrams illustrating an xDSL insertion system according to the prior art.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

Some embodiments of the present invention provide a compact copper connectivity scheme that may allow the easy insertion of enhanced telecommunication signals, such as xDSL signals, onto existing copper distribution pairs of a telecommunications company network or the like. In some embodiments, the system is configured to support environments where an xDSL service such as DSL, Asymmetric DSL (ADSL), Very high bit-rate DSL (VDSL) and/or VDSL2, is added to the distribution loop in neighborhoods that are already served by existing copper POTS lines. In these cases, a number of xDSL ports may be provisioned via electronic cabinets to serve a number of homes. Exemplary embodiments provide 48 ports for 200 homes, but the ratio and/or number of ports may vary. In some embodiments, the enhanced telecommunication signals may be, for example, High Definition Video services and/or Ethernet services.

Some embodiments of the present invention that may limit or even eliminate the above problems with conventional wiring of enhanced telecommunication services will now be described with reference to FIGS. 3-11. As will be described, some embodiments intercept the subscriber lines at a different place, and provide a different metallic connection method at the place of interception. More particularly, in some embodiments, the subscriber's signals are re-routed at the point in the back of a cross connect block where the old metallic connection blocks are terminated to the actual copper lines running to the residences. In some embodiments, a number of lines, such as 200 tip/ring pairs, may be accessed and routed to a device including a new connection block field 200, 300. Using, for example, industry standard 25 pair connectors, the signals are routed to the new connection block field 200, 300 and back again. This new connection block field 200, 300 may be very dense and may provide a disconnect switch for each line in the field 300.

Figure 4:
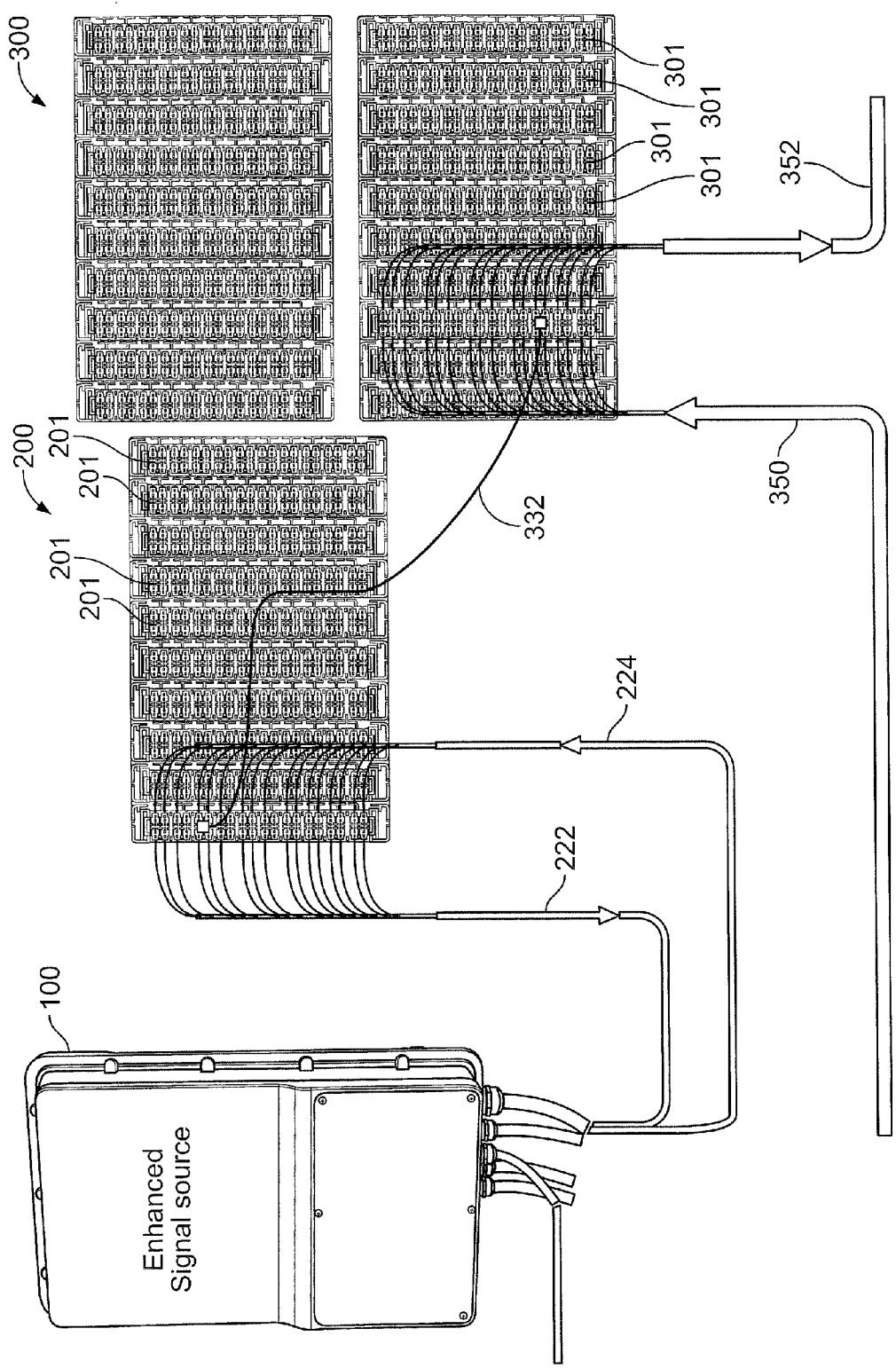
Figure 5:
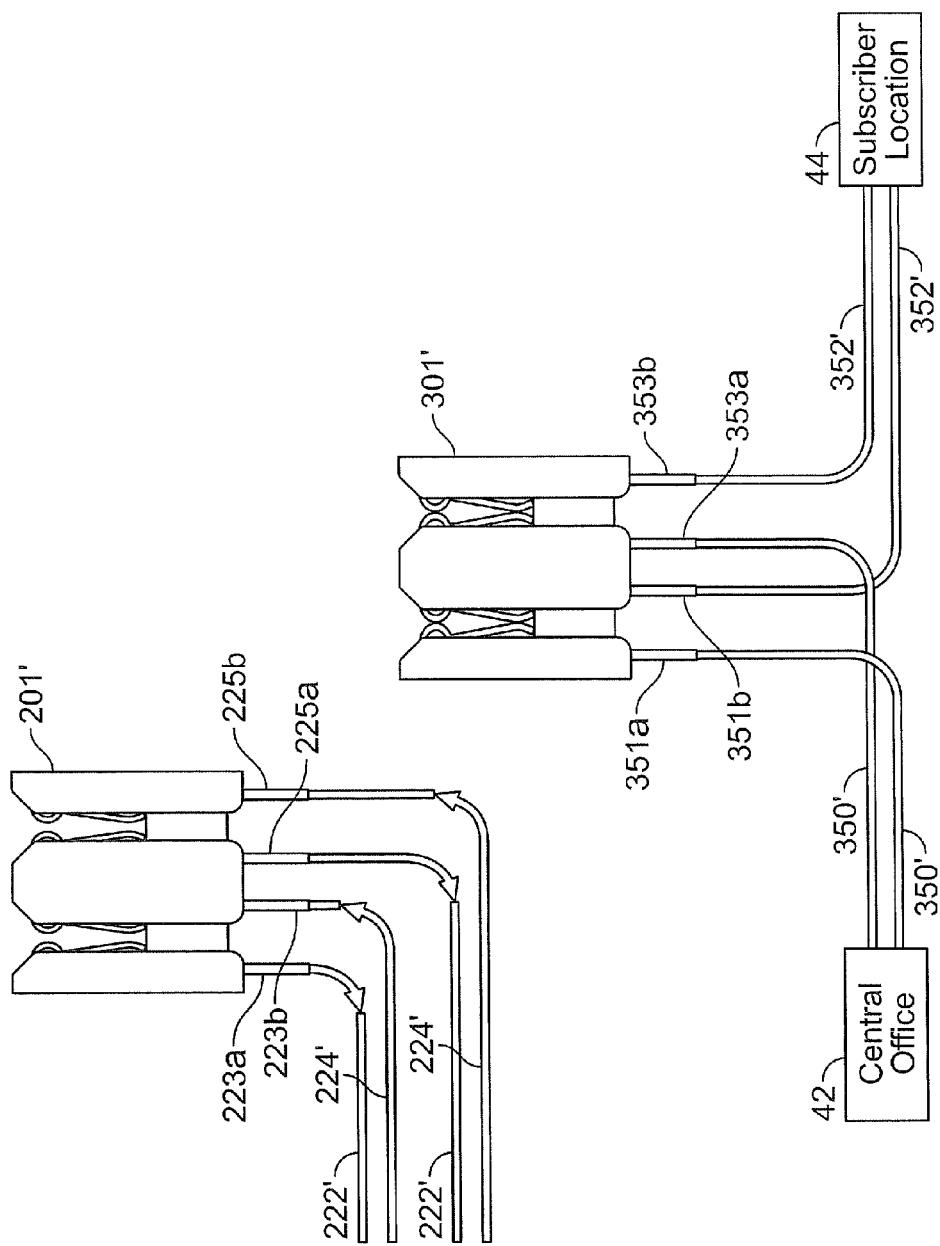
FIG. 5 is a schematic diagram illustrating switches for an exemplary tip and ring line pair for the enhanced telecommunication signal insertion system of FIGS. 3-4.
Figure 6:
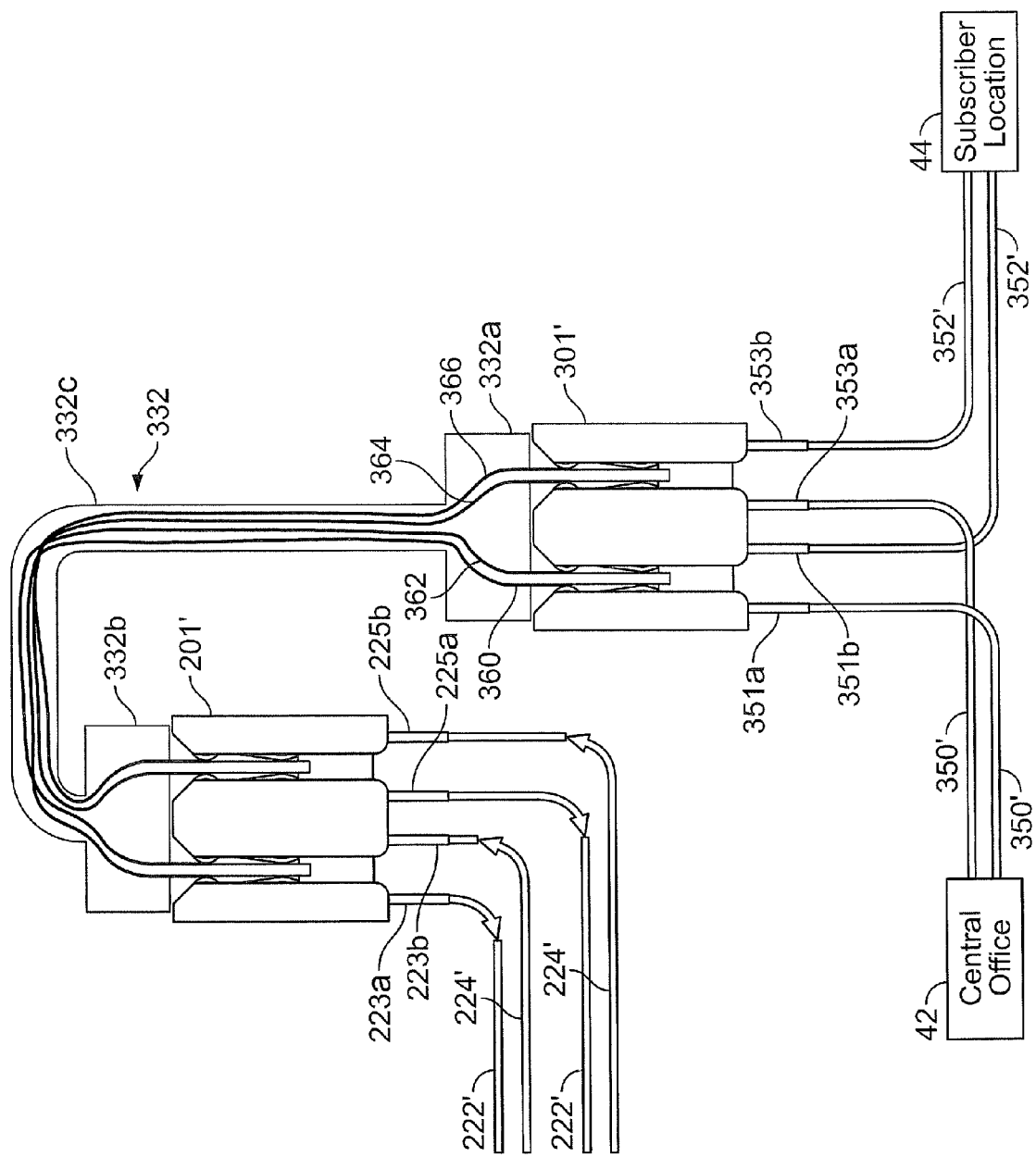
FIG. 6 is a schematic diagram illustrating the switches of FIG. 5 with a jumper plug installed.

As shown in FIGS. 4 and 6, the enhanced telecommunication signal insertion system is provided so as to insert an enhanced telecommunication signal onto cables 352, 352' that carry, for example, 200 pairs of POTS service tip and ring line pairs between a central office 42 and a subscriber location 44. The cable 350, 350' carries the respective tip and ring line pairs from the central office 42 to the connection block field 300, while the cables 352, 352' carry the tip and ring pairs to the subscriber locations 44. FIGS. 5 and 6 illustrate an exemplary tip and ring line pair 350', 352' and an exemplary switch 301' in the connector connection block field 300. Note that, as shown in FIGS. 5 and 6, references to a "switch" herein includes a paired contact arrangement. Further, it will be understood that, in some embodiments, the enhanced telecommunication signal does not get injected onto the central office side cables 350, 350' as it could interfere with the central office functioning. In some embodiments, there may be a splitter including in the DSLAM 100 that allows the xDSL signal to be inserted onto the subscriber side, but not back upstream to the central office.

Figure 3:
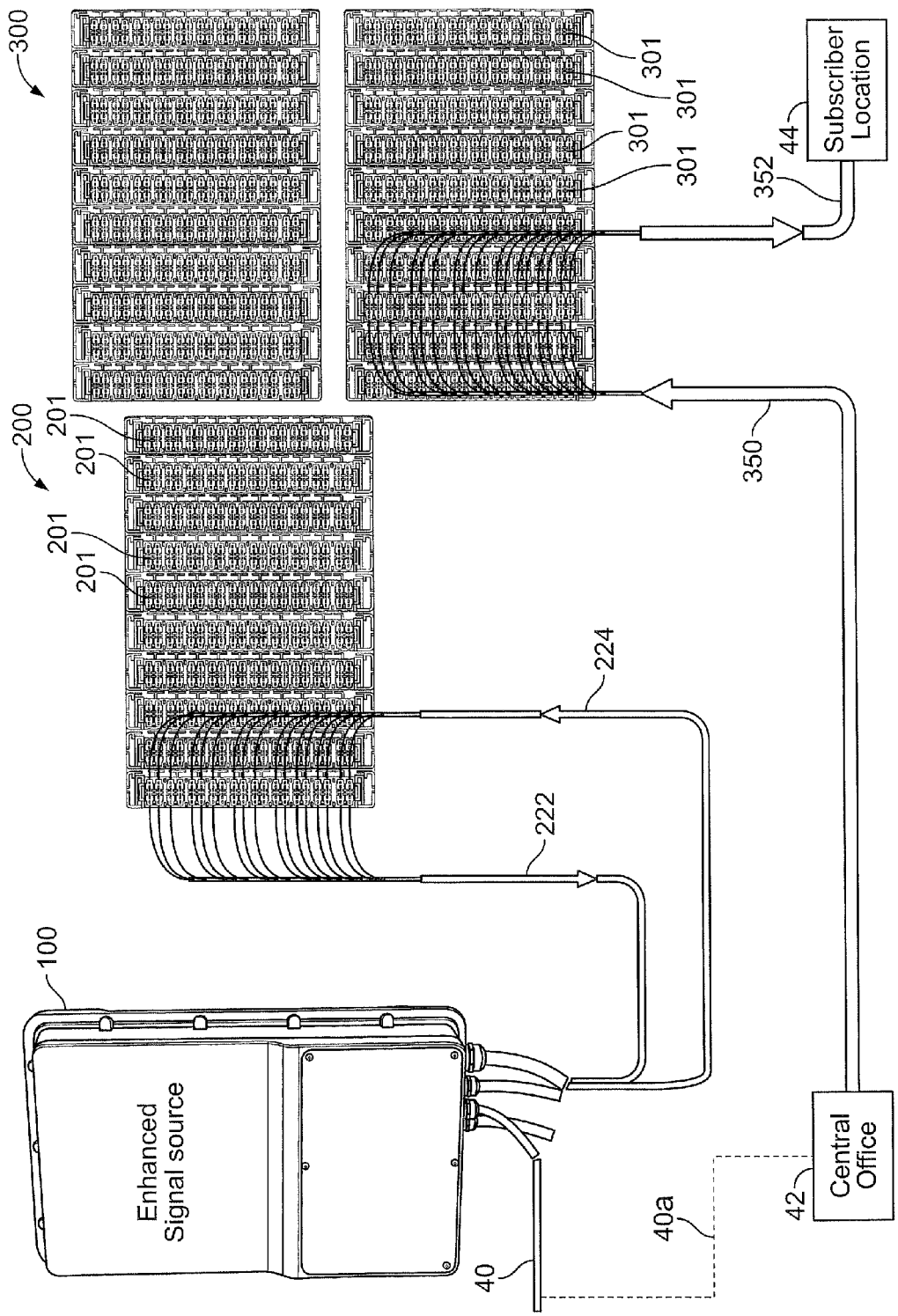
FIGS. 3 and 4 are schematic diagrams illustrating an enhanced telecommunication signal insertion system according to some embodiments of the present invention.

In addition, as best seen in FIGS. 3 and 4, signal lines 40, which may be optical fibers or the like, are fed into an enhanced signal source 100, shown as a 48 port DSLAM "brick" in FIGS. 3 and 4. A power feed may also be provided. As also indicated by the dotted line 40a, signal lines into the enhanced signal source 100 may be routed thereto from the central office 42 or another service provider distribution location point.

The enhanced telecommunications signal insertion system, according to the illustrated embodiments of the present invention as seen in FIGS. 3 and 4, includes both a first connection block field 200 and the second connection block field 300. Jumper plug(s) 332 are also included in the enhanced telecommunication signal insertion signal as seen in FIGS. 4 and 6. The first connection block field 200 includes a plurality of switches 201, 201' that are configured to be coupled to the enhanced signal source 100 by the cables 222, 221', 224, 224'. The switches 201, 201' are shown as normally open switches in FIG. 5. The second connection block field 300 includes a plurality of normally closed switches 301, 301' configured to connect respective pairs of tip and ring line 350, 350' from the central office 42 to corresponding pairs of tip and ring lines 352, 352' to their associated subscriber locations 44. Note that, while FIGS. 3 and 4 show the wiring connections through the respective switches in the connection block fields 200, 300 as visible, the wiring of such connections may, as seen in FIGS. 5 and 6, be to a back side of the respective switches and not leave wiring or the like blocking the front face of the switches as illustrated by the schematic lines in FIGS. 3 and 4. These lines are included for purposes of illustration to aid in understanding of some embodiments of the present invention.

The jumper plug 332 illustrated in FIG. 6 has a first connector 332a and a second connector 332b with a length of cable 332c therebetween. The first connector 332a is configured to be inserted in one of the normally closed switches 301, 301' of the second connection block field 300 to open the respective normally closed switch 301, 301'. The second connector 332b is configured to be inserted into one of the switches 201, 201' of the first connection block field 200. When inserted, the jumper plug 332 connects terminals 223a, 223b, 225a, 225b of the respective switch 201' of the first connection block field 200 to terminals 351a, 351b, 353a, 353b of the respective one of the normally closed switches 301' of the second connection block field 300 to allow insertion of the enhanced telecommunication signal onto a selected one of the pairs of tip and ring lines 350' from the central office 42 to one of the associated subscriber locations 44 associated with the corresponding one of the normally closed switches 301' of the second connection block field 300.

In some embodiments, the enhanced signal source 100 is an xDSL signal source, such as the illustrated DSLAM "brick", and the enhanced telecommunication signal is an xDSL signal. The xDSL signal source 100 may insert the xDSL signal onto the selected one of the pairs of tip and ring lines 350', 352' from the central office 42 and to the associated subscriber locations 44 along with other telecommunication signals carried between the central office 42 and the associated subscriber locations 44. In some embodiments, the other telecommunication signals may be POTS signals.

Referring now more particularly to FIGS. 5 and 6, in some embodiments, the terminals of the normally closed switch 301' include a first tip line terminal 351a and a first ring line terminal 353a configured to connect to the pair of tip and ring line 350' from the central office 42 and a second tip line terminal 351b and a second ring line terminal 353b configured to connect to a selected one of the pairs of tip and ring line 352' to the associated subscriber locations 44. The first tip line terminal 351a and the second tip line terminal 351b are normally connected by the switch 301' and the first ring line terminal 353a and the second ring line terminal 353b are also normally connected by the switch 301'. In other words, if a particular subscriber location 44 need not be provided an enhanced telecommunication signal, the signal lines from the central office 42 to the subscriber location 44 continue unbroken therebetween through the respective terminals of the normally closed switch 301'. Insertion of the first connector 332 is used to break the direct connection therebetween on the respective tip and ring lines through the switch 301'. In other words, the first connector 332a is configured to be inserted between the first and second tip line terminals 351a, 351b and the first and second ring line terminals 353a, 353b to break the connection therebetween provided by the normally closed switch 301'.

As seen in the embodiments of FIG. 6 with the jumper plug 332 inserted and providing a connection routing between respective switches 301' and 201', the length of cable 332c extending between the respective connectors 332a and 332b includes four conductors, 360, 362, 364, 366. The first conductor 360 extends from the first tip line terminal 351a to a first one of the terminals 223a of the switch 201' of the first connection block field 200, which is configured to be coupled to a first input 222' of the enhanced signal source 100. The second conductor 364 extends from the first ring line terminal 353a to a second one of the terminals 225a of the switch 201' of the first connection block field 200, which is configured to be coupled to a second input 222' to the enhanced signal source 100. The third conductor 362 extends from the second tip line terminal 351b to a third one of the terminals 223b of the switch 201' of the first connection block field 200, which is configured to be coupled to a first output 224' of the enhanced signal source 100. The fourth conductor 366 extends from this second ring line terminal 353b to a fourth one of the terminals 225b of the switch 201, which is configured to be coupled to a second output 224' of the enhanced signal source 100. Thus, the terminal 223a may carry the tip line signal into the enhanced signal source with the POTS signal from the central office 42 thereon while the terminal 223b receives from the enhanced signal source 100 a tip line carrying both the POTS signal and the enhanced telecommunication signal, such as an xDSL signal on the output line 224 from the enhanced signal source 100. Similarly, the ring input from terminal 225a is carried on input line 222' for the ring input into the enhanced signal source with the corresponding ring POTS signal while the return ring line from the enhanced signal source 224' carries the POTS signal and the inserted enhanced signal, such as an xDSL signal. In this manner, both the POTS signal communications between the central office 42 and subscriber location 44 may be maintained with the additional insertion of the enhanced telecommunications signal thereon using the already in place tip and ring lines to the subscriber location 44 from the central office 42. In other words, the enhanced signal source 100 may couple the POTS signals between the respective tip and ring inputs and outputs of the enhanced signal source so as to thereby couple the POTS signals between the central office 42, and subscriber locations 44 when the first connector 332a is inserted in the switch 301' and the second connector 332b is inserted in the switch 201' so that the opening of the switch 301' that provided a connection between the respective central office 42 and subscriber location 44 tip and ring lines is not lost when the first connector 332a breaks the connection therebetween formed by the switch 301'.

Thus, in the dormant state, the signal simply travels through the disconnect switch 300' in the field 300 unaltered and back again to the subscriber as a standard POTS signal on the line 352'. However, when a subscriber desires xDSL service to be added to their line 352', a jumper plug 332 is inserted into the disconnect switches 200', 300' that routes their POTS line to and from the enhanced signal source 100, shown as a DSLAM, which adds the enhanced telecommunication signal to the line.

Figure 2:
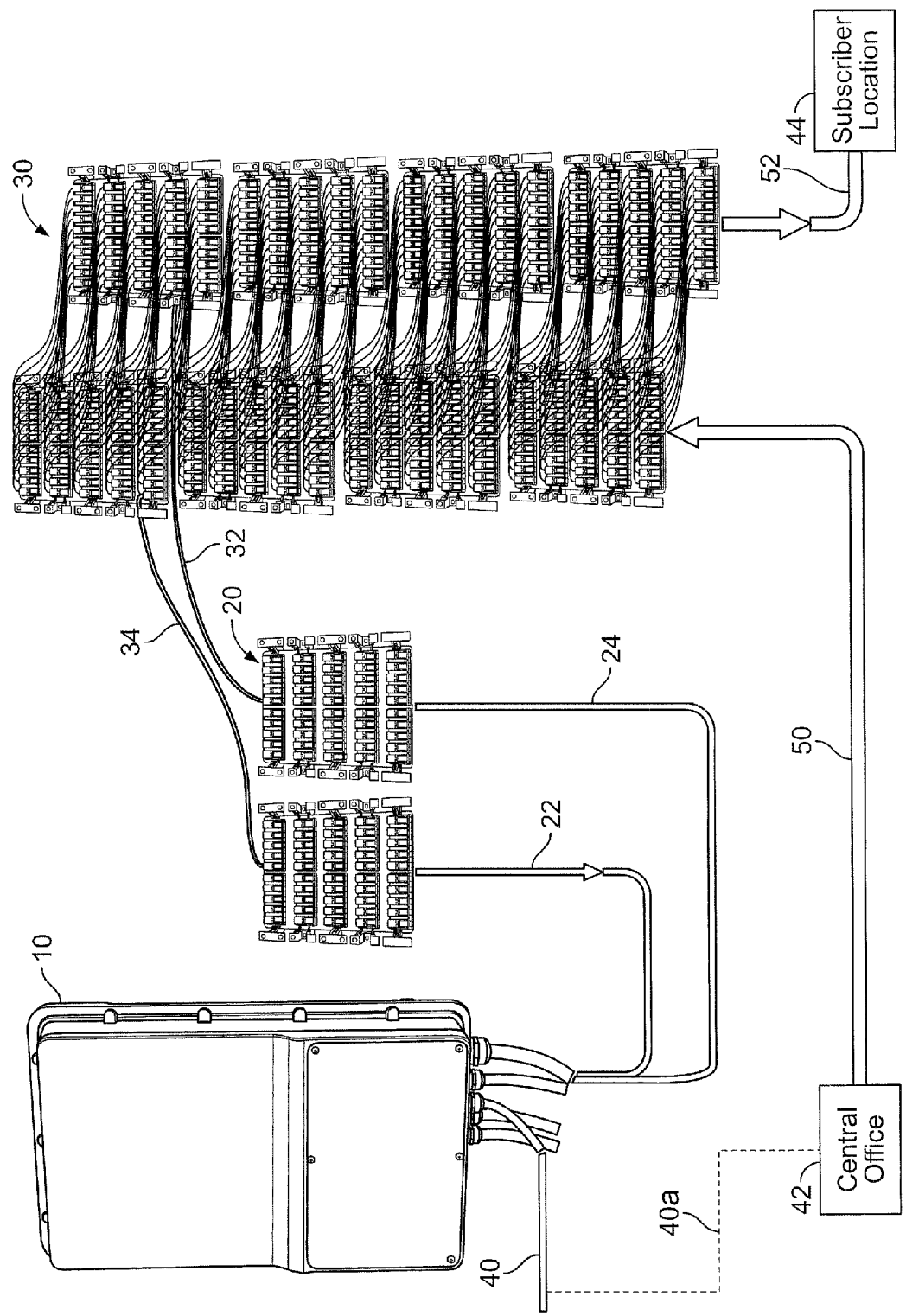

As described with reference to FIG. 6, the jumper plug 332 that is plugged into the switches 200', 300' may be a 4 wire jumper device, which simultaneously disconnects the normally closed switch 301' and connects the F1 (CO facing) side of the subscriber's line 350' to the input side 222' of the DSLAM 100 and the F2 (subscriber facing side) of the subscriber's line 352' to the output side 224' of the DSLAM 100. Thus, the entire interception and connection function can take place without disturbing any existing cross connect jumpers as contrasted with the approach shown in FIGS. 1-2. Indeed, the entire functionality described herein may, in some embodiments, be contained in an enclosure or device separate from the existing cross connect cabinet. However, it will be understood that, while a jumper plug 332 with two connectors 332a, 332b and two connection block fields 200, 300 are shown in FIGS. 3-6, in some embodiments, the conductors 360, 362, 364, 366 may be configured to connect the enhanced signal source 100 to the terminals 351a, 351b, 353a, 353b without the use of the second connector 332b or the first connection block field 200 and switches 201', which are shown as normally open switches in the illustrated embodiments. For example, the jumper plug 332 may extend as a pigtail from the enhanced signal source 100, either a permanently wired pigtail that is provided with the enhanced signal source 100 or mated with a connector provided on the enhanced signal source 100.

The interception of the cable to the subscriber neighborhood may occur at any point on that cable, not necessarily at the point where it is connected to the existing cross connect cabinet. For example, this may be achieved by digging up an existing 200 pair copper cable and making copper splices to the cables in order to achieve the ability to perform the insertion function.

Figure 7:
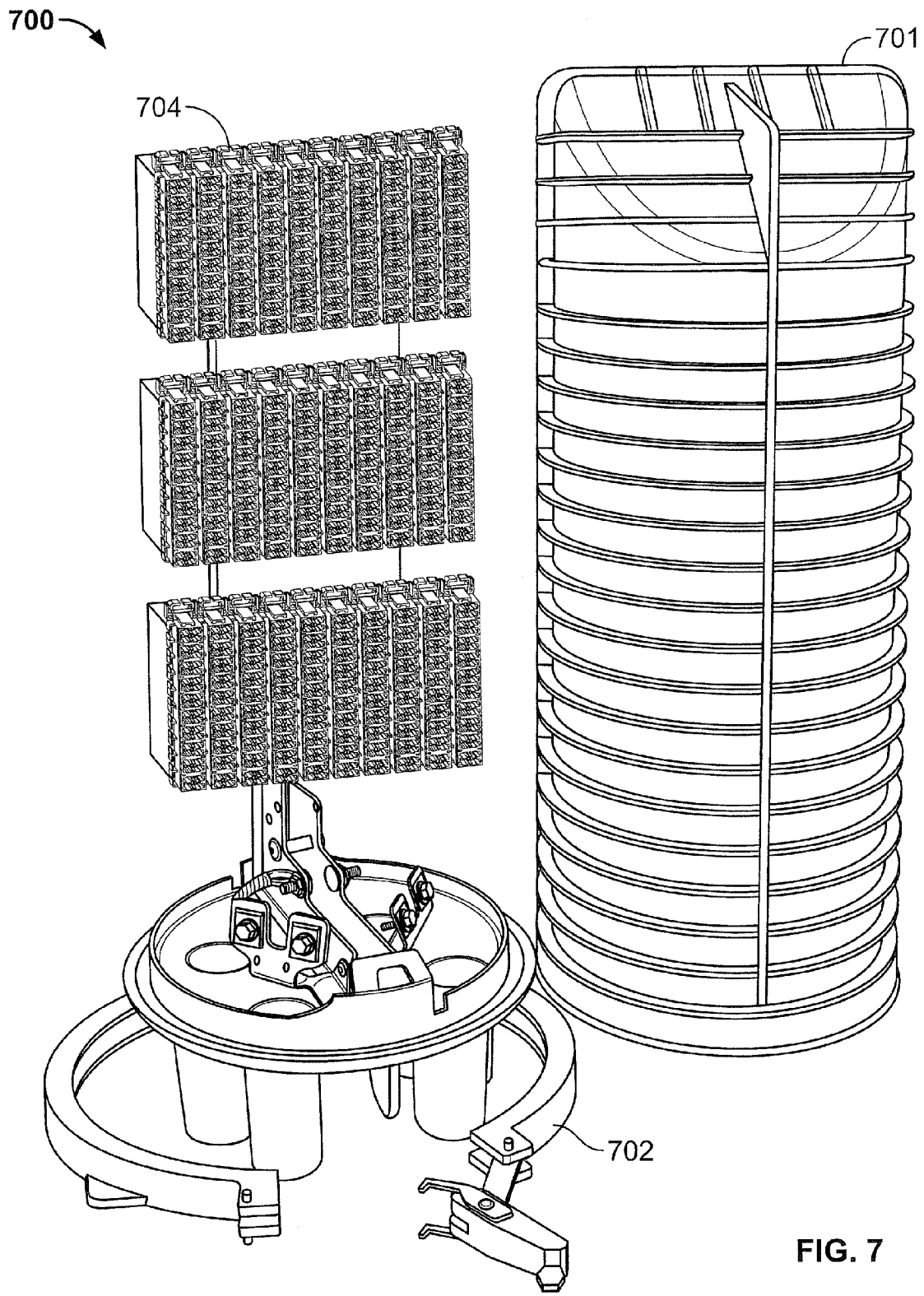
FIG. 7 is a perspective view illustrating an enclosure including an enhanced telecommunication signal insertion system according to some embodiments of the present invention.

FIG. 7 illustrates an enclosure 700 for use in housing a connection field 704 which may operate as described previously with reference to the first connection block field 200 and second connection block field 300 according to some embodiments of the present invention. As a result, the connection block fields 704 may be arranged inside a compact, re-enterable enclosure 700 for environmental protection and the like. The enclosure 700 is shown as including a base 702 to which wiring is routed and which may be provided an environmental seal with a cover 701 when the cover is placed over the connection field 704 and in mating engagement with the base 702.

Figure 8:
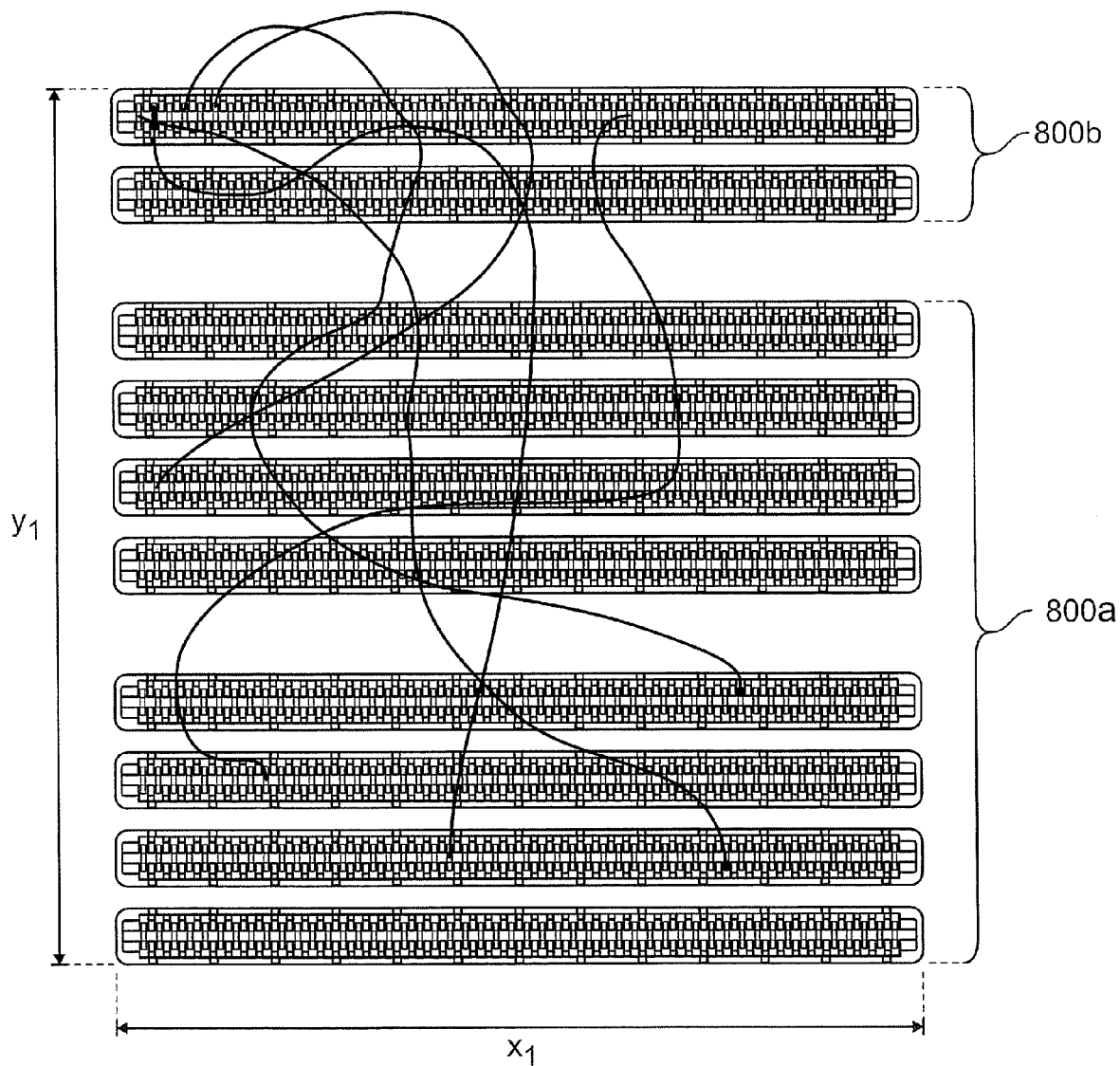
FIGS. 8 and 9 are schematic views illustrating connection block fields for an enhanced telecommunication signal insertion system according to some embodiments of the present invention.
Figure 9:
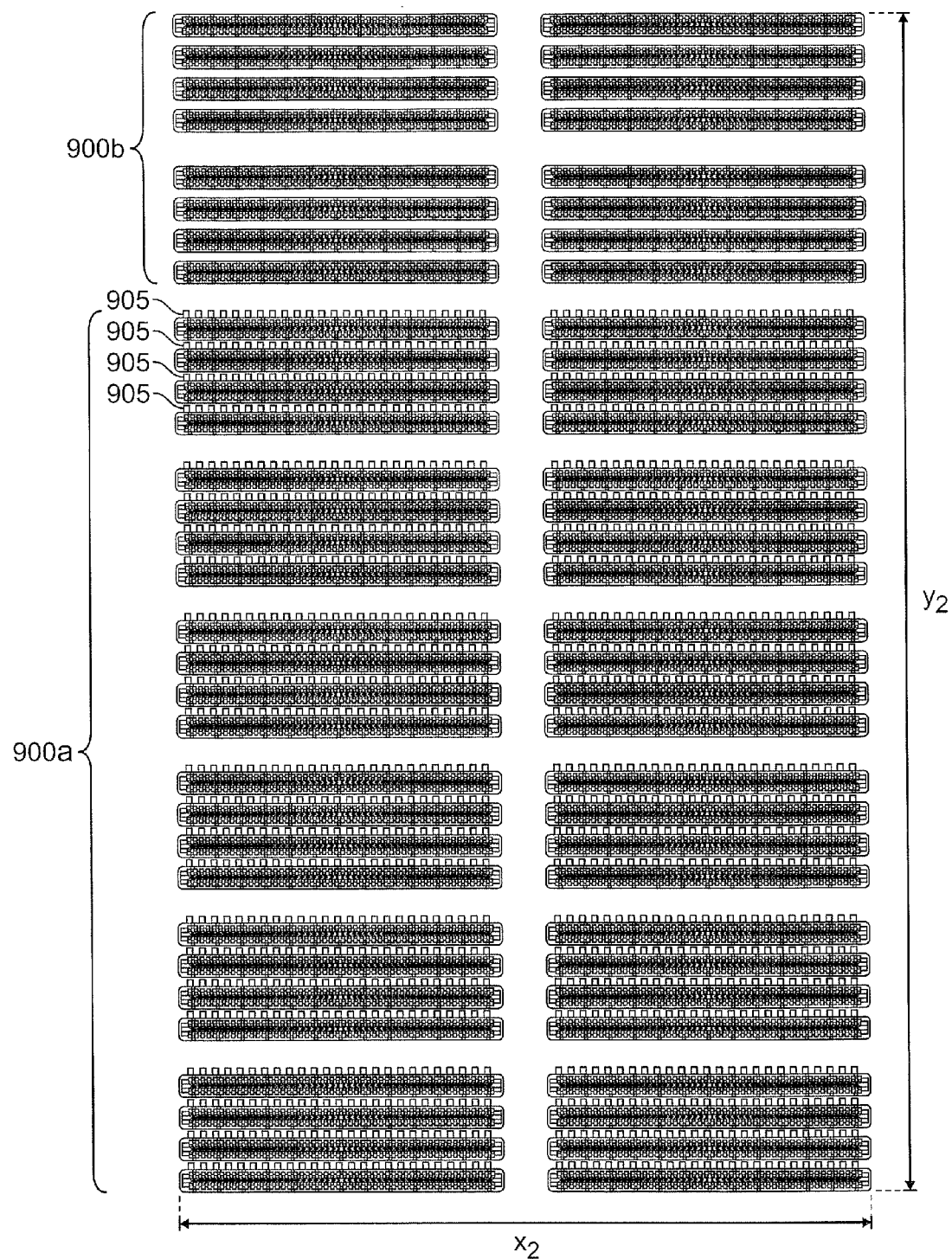

FIGS. 8 and 9 are schematic views illustrating connection block fields for an enhanced telecommunication signal insertion system according to some embodiments of the present invention. In particular, FIG. 8 illustrates the approximate dimensions for the connection fields 200, 300 in some embodiments for an installation of approximately 200 subscribers and approximately 50 DSLAM ports. The overall dimensions for the illustrated embodiments of FIG. 8 include a height $y_1$ and a length of $x_1$. For example, $y_1$ may be about 7 inches and $x_1$ may be about 6 inches. As shown by the illustrative schematic cross wiring, the field 800b may operate as the first connection block field 200 wired to the enhanced signal source 100 while the field 800a may operate as the second connection block field 300 and be wired to respective tip and ring lines between a central office 42 and subscriber locations 44. FIG. 9 illustrates dimensions for connection fields 900a (corresponding to the second connection block field 300) and 900b (corresponding to the first connection block field 200) that may be configured for installation of approximately 1200 subscribers and approximately 400 corresponding DSLAM ports. Height $y_2$ and width $x_2$ are shown. In some embodiments, $y_2$ may be about 25 inches and $x_2$ may be about 12 inches. Also shown in the embodiments of FIG. 9 are visual signal sources 905 associated with respective switches in the field 900a as will be further described.

In some embodiments, identification of the twisted pair belonging to the subscriber that desires to have the enhanced xDSL service provisioned to their line is provided. In some cases, tip/ring pair assignments in the field are not accurately reflected in company records. Thus, it may be difficult to reliably locate the subscriber's actual twisted pair wire within a cross connect or a distribution cable with accuracy. In some embodiments, to reduce or even eliminate this problem, a device to assist in identifying the subscriber's twisted pair is provided. More particularly, a signal receiving and identification means may be incorporated in the above connect and disconnect switch arrangement as will now be further described with reference to FIGS. 9-11.

Figure 10:
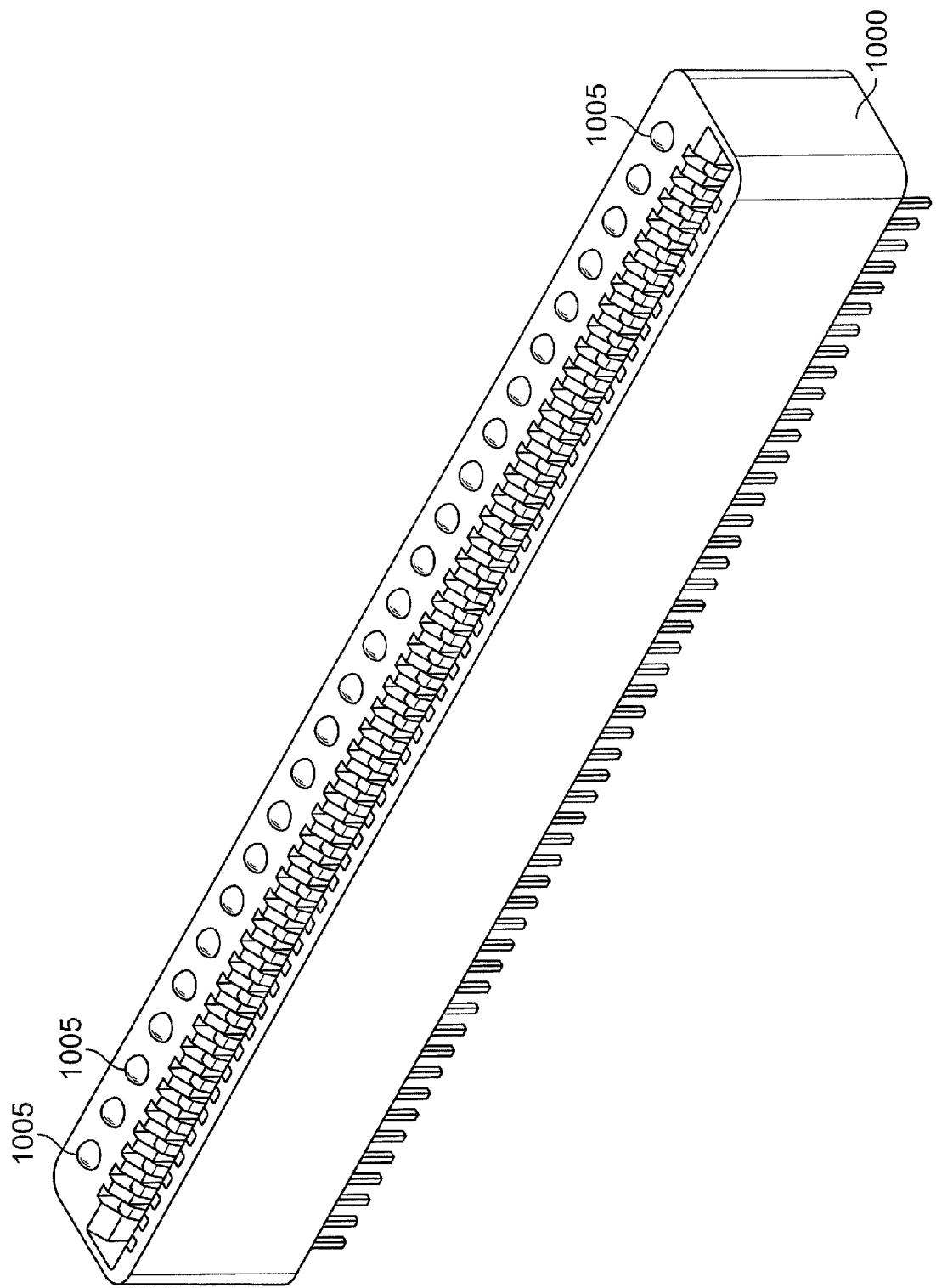
FIG. 10 is a perspective view of a connector block that may be used for the normally closed connector switch field of the connection block field of FIG. 9 according to some embodiments of the present invention.
Figure 11:
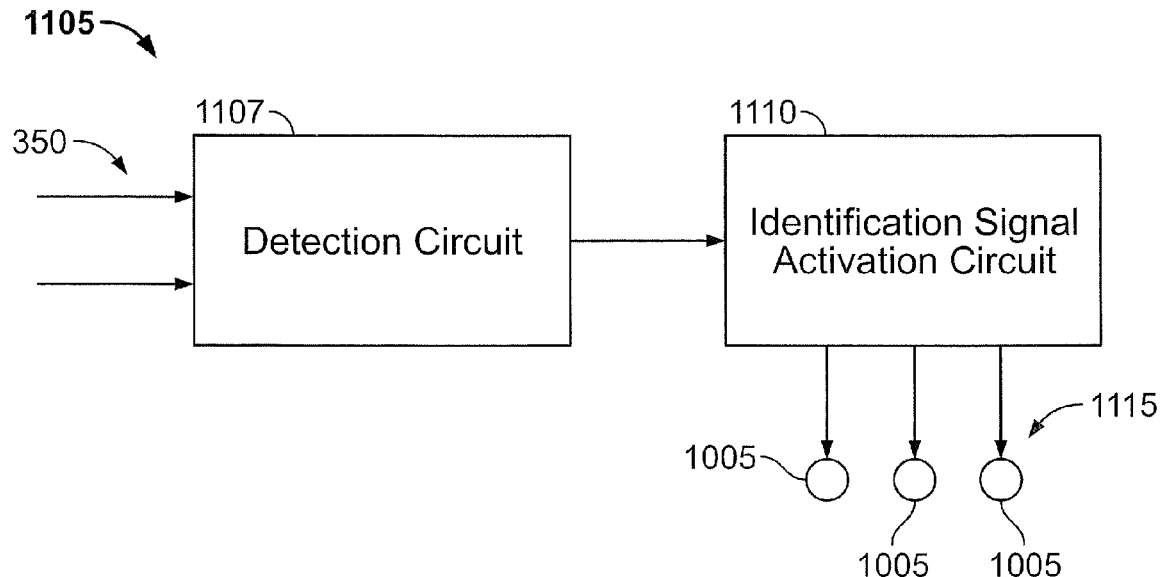
FIG. 11 is a schematic view of a signal receiving and identification module coupled to visual signal sources according to some embodiments of the present invention.

Referring now to FIG. 11, a schematic view is provided of a signal receiving an identification module 1105 coupled to visual signal sources 1005 according to some embodiments of the present invention. The visual signal sources 1005 may be LEDs or the like which may be positioned in a switch block 1000 proximate associated ones of a plurality of normally closed switches in the switch block 1000 as shown in FIG. 10. Switch block 1000 may be used for sections of the second connection block field 300 as shown by the field 900a in FIG. 9 including LEDs 905. More particularly, FIG. 10 is a perspective view of a connection block 1000 that may be used for the normally closed connector switch field 900a of FIG. 9 according to some embodiments of the present invention. However, as will be described further herein, switches may not need to be included in the block 1000 in some embodiments, where it provides a plug-in test device configured to be inserted in corresponding switches to provide a detection and indicating means to identify a desired subscriber location switch to be provided enhanced telecommunication signal services.

Referring again to FIG. 11, the illustrated embodiments of the signal receiving an identification module 1105 include a detection circuit 1107 and an identification signal activation circuit 1110. Tip and ring line input(s) 350 are provided from a plurality of pairs of tip and ring lines to the detection circuit 1105. The detection circuit 1107 is configured to identify one or more of the normally closed switches 301 to be coupled to the enhanced signal source 100. For example, the detection circuit 1107 may be configured to detect a ring signal on the selected one of the pairs of tip and ring lines from the central office 42 and to one of the associated subscriber locations 44 associated with a respective one of normally closed switches 301.

The identification signal activation circuit 1110 may be configured to activate an identification signal 1115 responsive to detection of the ring signal by the detection circuit 1107. In some embodiments, the detection circuit 1107 is configured to detect a specified ring signal pattern that is distinguishable from a normal ring signal pattern and the identification signal 1115 is activated responsive to the specified ring signal pattern and is not activated responsive to the normal ring signal pattern. Further, it will be understood that, while the description herein may reference to identification of a single one of the visual signal sources 1005, in some embodiments, the detection circuit 1107 may identify a plurality of visual signal sources 1005 that are to be activated and the identification signal activation circuit 1110 may be configured to select a plurality of identification signals 1115 to be activated responsive to the detection of such a plurality of identifications by the detection circuit 1107.

The identification signal output, while described above as a visual signal source, such as an LED, may be of several different kinds. Thus, detection of a line identification, for example, detection of the ringing voltage associated with a subscriber's phone being rung, may be used to activate a signal, which may allow the technician to make a visual and/or audible identification of the line or lines (i.e., multiple lines could be rung, for example). In some embodiments illustrated in FIGS. 9-11, the signal is a small LED light 905, 1005 next to each pair on the disconnect switch. So, for example, the technician would call the subscriber's telephone number and then look to see which LED light illuminates. As a result, the technician may know with relative certainty the pair belonging to the subscriber wishing to receive enhanced services. In further embodiments as described above, additional circuitry is provided that only illuminates the LED light if the technician dials the phone number in a specific pattern. For example, the technician may need to dial the number, hang up, and dial again within 30 seconds in order for the LED light to illuminate. Patterning schemes such as this may assist in positive identification of a line even if several other phone lines are ringing simultaneously in the connection field. In some embodiments, the identification signal output may also be configured to be triggered by standard "tone generation" systems that exist in many standard central offices.

As noted above, in further embodiments, the signaling function may be contained within a plug-in test device instead of being incorporated into the disconnect switch itself. For example, the LED light may be contained in a plug device that plugs into the disconnect switch and is illuminated by a similar signaling means. For example, the device 1000 of FIG. 10, rather than being a switch block, may be a plug-in test device and the plugs shown on the bottom face thereof may be configured to plug into switches, such as those illustrated in FIGS. 5 and 6, to position the LEDs 1005 proximate corresponding ones of the switches into which the device 1000 is inserted. The plug-in test device may plug into and span several subscriber pairs at once, for example, 25 pairs at a time. Such a device may have an LED signaling light 1005 for each of the 25 pairs and the user would insert the device into each bank of 25 pairs until finding the line in question. Such embodiments may simplify the system by not requiring the LED signal-light and associated circuitry for each and every pair, and providing that functionality in a separate plug-in test device.

Figure 12:
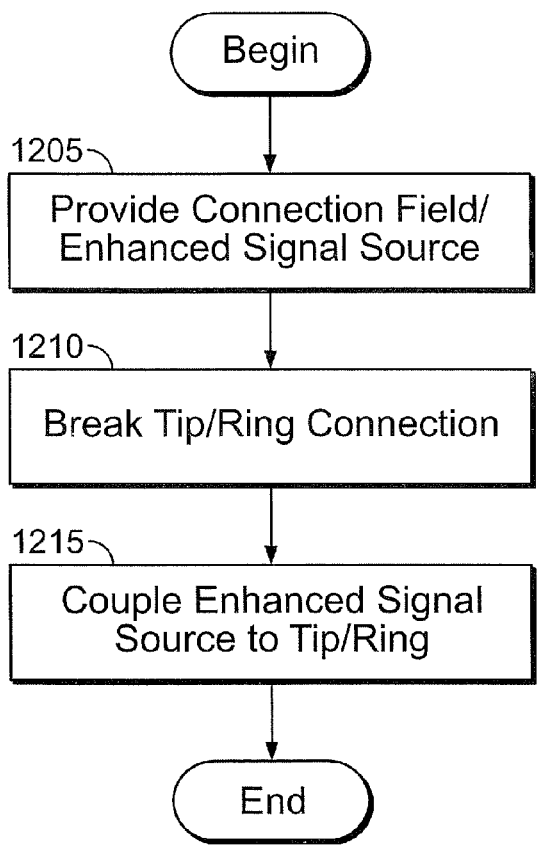
FIG. 12 is a flowchart illustrating operations for inserting an enhanced telecommunication signal onto a pair of tip and ring lines from a central office to a subscriber location according to some embodiments of the present invention.

Embodiments of methods of inserting an enhanced telecommunication signal onto a pair of tip and ring lines from a central office to a subscriber location will now be described with reference to the flowchart illustration of FIG. 12. As shown in FIG. 12, operations begin at block 1205 by providing/identifying the tip and ring line network from the central office to the subscriber location and an enhanced signal source. The connection of the tip and ring lines is broken at a connection block field located between the central office and the subscriber location by inserting a connector on a first end of a jumper plug into a normally closed switch in the connection block field to open the normally closed switch (Block 1210). The normally closed switch is configured to connect respective central office and subscriber sides of the tip line and central office and subscriber sides of the ring line when closed. A second end of the jumper plug is connected to an enhanced signal source (Block 1215). When the connector is inserted into the normally closed switch, the jumper plug connects the enhanced signal source to terminals of the normally closed switch to allow insertion of the enhanced telecommunication signal onto the central office and subscriber side tip and ring lines. In some embodiments, when the connector is inserted into the normally closed switch, the jumper plug connects the enhanced signal source to terminals of the normally closed switch to allow the enhanced signal source to insert the enhanced telecommunication signal onto the of tip and ring lines along with other telecommunications signals carried between the central office and the subscriber side.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed:

1. An enhanced telecommunication signal insertion system, comprising:
    a first connection block field including a plurality of switches configured to be coupled to an enhanced signal source;
    a second connection block field including a plurality of normally closed switches configured to connect respective pairs of tip and ring lines from a central office to corresponding pairs of tip and ring lines to associated subscriber locations; and
    a jumper plug having a first connector and a second connector with a length of cable extending therebetween, wherein the first connector is configured to be inserted in one of the normally closed switches of the second connection block field to open the one of the normally closed switches and the second connector is configured to be inserted in one of the switches of the first connection block field, wherein, when inserted, the jumper plug connects terminals of the one of the switches of the first connection block field to terminals of the one of the normally closed switches of the second connection block field to allow insertion of the enhanced telecommunication signal onto a selected one of the pairs of tip and ring lines to one of the associated subscriber locations associated with the one of the normally closed switches of the second connection block field.

2. The system of claim 1, wherein the enhanced signal source comprises a Digital Subscriber Line (xDSL) signal source and the enhanced telecommunication signal comprises an xDSL signal.

3. The system of claim 2, wherein the xDSL signal source inserts the xDSL signal onto the selected one of the pairs of tip and ring lines to the associated subscriber locations along with other telecommunications signals carried between the central office and the one of the associated subscriber locations.

4. The system of claim 3, wherein the other telecommunications signals comprise plain old telephone service (POTS) signals.

5. The system of claim 3, wherein the terminals of the one of the normally closed switches include a first tip line terminal and a first ring line terminal configured to connect to the selected one of the pairs of tip and ring lines from the central office and a second tip line terminal and a second ring line terminal configured to connect to the selected one of the pairs of tip and ring lines to the subscriber associated subscriber locations, the first tip line terminal and the second tip line terminal being normally connected and the first ring line terminal and the second ring line terminal being normally connected.

6. The system of claim 5, wherein the first connector is configured to be inserted between the first and second tip line terminals and the first and second ring line terminals to break the connection therebetween.

7. The system of claim 6, wherein the length of cable includes:
    a first conductor extending from the first tip line terminal to a first one of the terminals of the one of the switches of the first connection block field configured to be coupled to a first input to the enhanced signal source;

a second conductor extending from the first ring line terminal to a second one of the terminals of the one of the switches of the first connection block field configured to be coupled to a second input to the enhanced signal source;

a third conductor extending from the second tip line terminal to a third one of the terminals of the one of the switches of the first connection block field configured to be coupled to a first output of the enhanced signal source; and a fourth conductor extending from the second ring line terminal to a fourth one of the terminals of the one of the switches of the first connection block field configured to be coupled to a second output of the enhanced signal source.

8. The system of claim 7, wherein the enhanced signal source comprises a Digital Subscriber Line Access Multiplexer (DSLAM).

9. The system of claim 8, wherein the other telecommunications signals comprise plain old telephone service (POTS) signals and wherein the DSLAM is configured to couple the POTS signals between the first input to the DSLAM and the first output of the DSLAM and between the second input of the DSLAM and the second output of the DSLAM to couple the POTS signals between the central office and the one of the associated subscriber locations when the first connector is inserted in the one of the normally closed switches of the second connection block field to open the one of the normally closed switches.

10. The system of claim 9, further comprising the DSLAM and wherein first one of the terminals is coupled to the first input to the DSLAM, the second one of the terminals is coupled to the second input to the DSLAM, the third one of the terminals is coupled to the first output of the DSLAM and the fourth one of the terminals is coupled to the second output of the DSLAM.

11. The system of claim 10, further comprising the respective pair of tip and ring lines from the central office and pairs of tip and ring lines to the associated subscriber locations coupled to the plurality of normally closed switches of the second connection block field.

12. The system of claim 1, further comprising a signal receiving and identification module configured to identify the one of the normally closed switches to be coupled to the enhanced signal source.

13. The system of claim 12, wherein the signal receiving and identification module is configured to detect a ring signal on the selected one of the pairs of tip and ring lines from the central office and to one of the associated subscriber locations associated with the one of the normally closed switches and to activate an identification signal responsive to detection of the ring signal.

14. The system of claim 13, wherein the signal receiving and identification module is configured to detect a specified ring signal pattern that is distinguishable from a normal ring signal pattern and the identification signal is activated responsive to the specified ring signal pattern and is not activated responsive to the normal ring signal pattern.

15. The system of claim 13, wherein the signal receiving and identification module includes a plurality of visual signal sources, a selected one of which is activated responsive to the identification signal, ones of which are positioned proximate respective associated ones of the plurality of normally closed switches.

16. The system of claim 13, wherein the signal receiving and identification module comprises a plug-in test device configured to be inserted into the one of the normally closed switches, the plug-in test device including a visual signal source positioned proximate the one of the normally closed switches when the plug-in test device is inserted therein that is activated responsive to the identification signal.

17. The system of claim 16, wherein the plug-in test device is configured to be concurrently inserted into a plurality of the normally closed switches and the plug-in test device includes a plurality of visual signal sources, a selected one of which is activated responsive to the identification signal, ones of which are positioned proximate respective associated ones of the plurality of normally closed switches when the plug-in test device is inserted therein.

18. An enhanced telecommunication signal insertion system, comprising:
a connection block field including a plurality of normally closed switches configured to connect respective tip and ring lines from a central office to subscriber locations; and
a jumper plug having a connector on a length of cable extending from an enhanced signal source, wherein the connector is configured to be inserted in one of the normally closed switches of the connection block field to open the one of the normally closed switches, wherein, when the connector is inserted in the one of the normally closed switches, the jumper plug connects the enhanced signal source to terminals of the one of the normally closed switches of the connection block field to allow insertion of the enhanced telecommunication signal source onto the respective tip and ring lines to the subscriber locations.

19. A method of inserting an enhanced telecommunication signal onto a pair of tip and ring lines from a central office to a subscriber location, the method comprising:
breaking the connection of the tip and ring lines at a connection block field located between the central office and the subscriber location by inserting a connector on a first end of a jumper plug into a normally closed switch in the connection block field to open the normally closed switch, the normally closed switch being configured to connect respective central office and subscriber sides of the tip line and central office and subscriber sides of the ring line when closed; and
coupling a second end of the jumper plug to an enhanced signal source, wherein, when the connector is inserted into the normally closed switch, the jumper plug connects the enhanced signal source to terminals of the normally closed switch to allow insertion of the enhanced telecommunication signal onto the subscriber side tip and ring lines.

20. The method of claim 19, wherein, wherein, when the connector is inserted into the normally closed switch, the jumper plug connects the enhanced signal source to terminals of the normally closed switch to allow the enhanced signal source to insert the enhanced telecommunication signal onto the of tip and ring lines along with other telecommunications signals carried between the central office and the subscriber side.

\* \* \* \* \*